US011316683B2

(12) United States Patent
Park et al.

(10) Patent No.: US 11,316,683 B2
(45) Date of Patent: Apr. 26, 2022

(54) SYSTEMS AND METHODS FOR PROVIDING IOT SECURITY SERVICE USING HARDWARE SECURITY MODULE

(71) Applicant: CIOT, Seongnam-si (KR)

(72) Inventors: Hyeon Ju Park, Yongin-si (KR); Han Na Park, Incheon (KR)

(73) Assignee: CIOT, Seongnam-si (KR)

( * ) Notice: Subject to any disclaimer, the term of this patent is extended or adjusted under 35 U.S.C. 154(b) by 327 days.

(21) Appl. No.: 16/724,205

(22) Filed: Dec. 21, 2019

(65) Prior Publication Data

US 2021/0152341 A1 May 20, 2021

(30) Foreign Application Priority Data

Nov. 18, 2019 (KR) .......................... 10-2019-0147867
Dec. 19, 2019 (KR) .......................... 10-2019-0171018

(51) Int. Cl.
*H04L 29/06* (2006.01)
*H04L 9/08* (2006.01)
*G06F 21/70* (2013.01)

(52) U.S. Cl.
CPC .............. *H04L 9/088* (2013.01); *G06F 21/70* (2013.01); *H04L 9/0861* (2013.01)

(58) Field of Classification Search
CPC ..... H04L 9/088; H04L 9/0861; H04L 9/3247; H04L 9/3268; H04L 9/0897; H04L 2209/805; G06F 21/70; G06F 21/53; G06F 21/71

See application file for complete search history.

(56) References Cited

U.S. PATENT DOCUMENTS

| 10,346,614 | B1* | 7/2019 | Ko ........................ H04L 9/3247 |
| 2015/0046335 | A1* | 2/2015 | Huxham .......... H04N 21/42204 705/64 |
| 2015/0227139 | A1* | 8/2015 | Yamamoto .......... F02D 41/1441 700/110 |
| 2015/0296022 | A1* | 10/2015 | Kim ..................... H04L 67/2823 709/203 |
| 2015/0358161 | A1* | 12/2015 | Kancharla ............. G06F 21/602 713/164 |
| 2018/0219671 | A1* | 8/2018 | Velissarios .............. G06F 21/72 |
| 2019/0158370 | A1* | 5/2019 | You ..................... H04L 41/0853 |

(Continued)

FOREIGN PATENT DOCUMENTS

| CN | 107710718 | A | * | 2/2018 | ......... H04L 12/2807 |
| CN | 109565509 | A | * | 4/2019 | .......... H04W 12/069 |
| CN | 110024422 | A | * | 7/2019 | ............. H04L 69/18 |

(Continued)

*Primary Examiner* — John B King
(74) *Attorney, Agent, or Firm* — Studebaker & Brackett PC (57) ABSTRACT

Provided are a system and method for providing an Internet of Things (IoT) security service using a hardware security module. The system includes a host device configured to transmit a security service request by calling a security service application programming interface (API) and a security module configured to convert the security service request into a security execution request and execute the security execution request by calling a security API. According to the call of the security API, the security module converts the security execution request into a request to execute a security algorithm executable by at least one of a security element and a security storage.

8 Claims, 5 Drawing Sheets

(56) References Cited

U.S. PATENT DOCUMENTS

2019/0342079 A1* 11/2019 Rudzitis ................. H04L 9/083
2020/0204463 A1*  6/2020 Guan ................... H04L 63/1441

FOREIGN PATENT DOCUMENTS

| CN | 110505216 A | * | 11/2019 |
| KR | 10-2012-0071945 A | | 7/2012 |
| KR | 10-2015-0023145 A | | 3/2015 |
| KR | 20150116344 A | * | 10/2015 |
| KR | 102164473 B1 | * | 10/2020 |

* cited by examiner

SYSTEMS AND METHODS FOR PROVIDING IOT SECURITY SERVICE USING HARDWARE SECURITY MODULE

CROSS-REFERENCE TO RELATED APPLICATION

This application claims priority under 35 U.S.C. § 119 to Korean Patent Application No. 10-2019-0147867, filed in the Korean Intellectual Property Office on Nov. 18, 2019, and Korean Patent Application No. 10-2019-0171018, filed in the Korean Intellectual Property Office on Dec. 19, 2019, the entire contents of which are hereby incorporated by reference.

TECHNICAL FIELD

The present disclosure relates to a system and method for providing an Internet of Things (IoT) security service using a hardware security module (HSM) and more particularly, to an IoT security service providing system and method for efficiently and easily managing and controlling an HSM by providing a high level programming interface for processing a security service request of an IoT device in order to provide an IoT security service using the HSM.

BACKGROUND

In general, IoT refers to a technology or an environment for collecting data of objects or the surroundings thereof by using a device with limited resources, such as a sensor, and transmitting and receiving the collected data through a wireless network. IoT is being applied to and used in various fields. For example, IoT provides a method for managing and monitoring manufacturing facilities, such as a smart factory, medical equipment for real-time diagnosis and healthcare data collection, traffic facilities, such as a smart vehicle, financial payment services employing a smart phone or a wearable device, and the like, in real time at a remote place.

However, most IoT services are based on a public Internet network and wireless communication, and thus IoT devices connected to the network may be attacked by a malicious attacker. Consequently, the security of devices connected to the IoT is problematic.

Also, devices connected to the IoT are manufactured as light and small electronic devices and have limited hardware resources (e.g., a limited capacity of memory, power, and processing). Therefore, it is difficult to install and execute software for applying sufficient security functions in the devices. Further, developing software based on an algorithm for performing various security functions, such as encryption, by using the processor and memory of a device is very complicated, and the development process requires much time and cost.

SUMMARY

To solve the above-described problems of Internet of Things (IoT) security, the present disclosure is directed to providing a hardware system configuration and a programming interface for allowing a hardware-based security module to be easily controlled or a security algorithm to be easily executed.

According to an aspect of the present disclosure, there is provided a system for providing an IoT security service using a hardware security module (HSM), the system including a host device configured to transmit a security service request by calling a security service application programming interface (API), and a security module configured to convert the security service request into a security execution request and execute the security execution request by calling a security API. According to the call of the security API, the security module converts the security execution request into a request to execute a security algorithm executable by at least one of a security element and a security storage.

The security module may be configured to execute the security algorithm by controlling at least one of the security element and the security storage when execution of the security algorithm is requested.

The security storage may store at least a part of security data including a private key for device authentication, a device certificate, and security firmware.

The security element may perform a security function including a function of generating a key for device authentication and a function of accelerating an encryption engine.

When the security service API is called by the host device, the security service API may receive a first parameter for defining the security service request and convert the first parameter into a second parameter processable by the security module. When the security API is called by the security module, the second parameter may be converted into a third parameter processable by the security algorithm, and the security algorithm may be executed to control at least one of the security element and the security storage on the basis of the third parameter.

According to another aspect of the present disclosure, there is provided a method of providing an IoT security service using an HSM, the method including: transmitting, by a host device, a security service request by calling a security service API; converting, by a security module, the security service request into a security execution request and calling a security API for executing the security execution request; and converting, by the security module, the security execution request into a request to execute a security algorithm executable by at least one of a security element and a security storage according to the call of the security API.

The method may further include executing, by the at least one of the security element and the security storage, the security algorithm when execution of the security algorithm is requested.

The method may further include: when the security service API is called by the host device, receiving, by the security service API, a first parameter for defining the security service request and converting the first parameter into a second parameter processable by the security module; when the security API is called by the security module, converting, by the security API, the second parameter into a third parameter processable by the security algorithm; and controlling, by the security algorithm, at least one of the security element and the security storage on the basis of the third parameter.

BRIEF DESCRIPTION OF THE DRAWINGS

Embodiments of the present invention will be described, by way of example only, and with reference to the following drawings.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

It should be noted that in the drawings, like components or parts may be represented by like reference numerals, if possible. In describing the present disclosure, when a detailed description about a related well-known art may obscure the gist of the present disclosure, the detailed description thereof will not be provided.

In the accompanying drawings, like or relevant components may be indicated by like reference numerals. In the following description of the embodiments, repeated descriptions of the identical or relevant components may be omitted. However, even if a description of a component is omitted, such a component is not intended to be excluded in an embodiment.

Hereinafter, terms used in the present disclosure will be briefly described, and exemplary embodiments of the present disclosure will be described in detail. Terms used in the present disclosure have been selected as general terms which are widely used at present in consideration of functions in the present disclosure but may be altered according to the intent of an operator skilled in the art, a precedent, the advent of new technology, or the like. In some cases, there is a term which is arbitrarily selected by the applicant, and in this case, the meaning of the term will be described in detail in a corresponding description of the disclosure. Therefore, terms should be defined on the basis of the meanings thereof and the entire content of the present disclosure instead of the simple names thereof.

In the present disclosure, singular forms include the plural forms as well unless the context clearly indicates otherwise. Also, plural forms include the singular forms as well unless the context clearly indicates otherwise.

Throughout the present disclosure, when it is described that a part is referred to as "including" a component, it should be understood that it does not exclude other components and may include other components unless particularly indicated otherwise.

In the present disclosure, the term "module" denotes a software component, a hardware component, or a combination thereof, and a module may be configured to perform a specific role or function. However, the term "module" is not limited to software or hardware. A module can be configured to be present in an addressable storage medium and configured to operate one or more processors. Consequently, examples of a module include components, such as software components, object-oriented software components, class components, and task components, processes, functions, attributes, procedures, subroutines, segments of program code, drivers, firmware, microcode, circuitry, data, databases, data structures, tables, arrays, and variables. Functions provided by components and modules described herein may be combined into a smaller number of components and modules or subdivided into additional components and modules.

In the present disclosure, the term "security module" may denote a hardware component, a software component, or a combination thereof which performs an arbitrary security function, such as a key generation function for Internet of Things (IoT) device authentication, an encryption function, or a security monitoring function. Hereinafter, when a hardware security module (HSM) is described in exemplary embodiments of the present disclosure, the HSM may denote an HSM which is manufactured as a lightweight HSM which may be embedded in or coupled to an IoT device.

In the present disclosure, the term "security element" may denote a hardware component which performs an arbitrary security function such as a key generation and storage function for IoT device authentication, an encryption function, an encryption acceleration function, or a security monitoring function.

In the present disclosure, the term "security storage" may denote a memory or another form of storage component which stores a certificate for IoT device authentication, firmware for performing a security function, or other security-related data.

In the present disclosure, the term "system" may refer to one or more IoT devices, computing devices, security modules, or software modules or components which execute a security function, or a combination thereof. For example, a system may indicate one or more computing devices, server devices, or distributed computing devices which provide a cloud service but is not limited thereto. Hereinafter, when exemplary embodiments of a system including a security service application programming interface (API) are described, the system may denote a software architecture, an operating system, a library, or a driver implementing the security service API or a combination thereof and one or more components of an HSM.

In the present disclosure, the term "cloud" or "cloud environment" may refer to a cloud computing system or a cloud computing infrastructure providing expandable computing resources as a service in a network. Specifically, cloud computing may denote computing power for providing abstraction between computing resources and a technical architecture (e.g., a server, a storage, and a network) therein. With cloud computing, it is possible to provide an on-demand network access to a shared pool of configurable computing resources that can be rapidly provided while minimizing interaction with a service provider or management effort. Accordingly, in a cloud, a user can access virtual computing resources (e.g., a storage, data, an application, and a virtualized computing system) without needing to know a physical system (or the location of the system) and the like used to provide computing resources.

In the present disclosure, the term "API" may refer to an interface or communication protocol between computer programs or different parts of codes for simplifying implementation and management of the computer programs or codes executed by a computing device. For example, an API may be intended for computer hardware or software or operating software and may be in any of various forms such as a routine, a data structure, an object class, a variable, or a remote call. The term "security service API" or "security API" used in the present disclosure may refer to a specific interface between an IoT device and an HSM connected thereto. For example, when an IoT device requests a specific security service through a security service API, the IoT device may acquire specific reply data or information (e.g., a security key and encrypted data) from a security module or cause a security module to start a previously defined specific operation (e.g., security key generation or data encryption).

Figure 1:
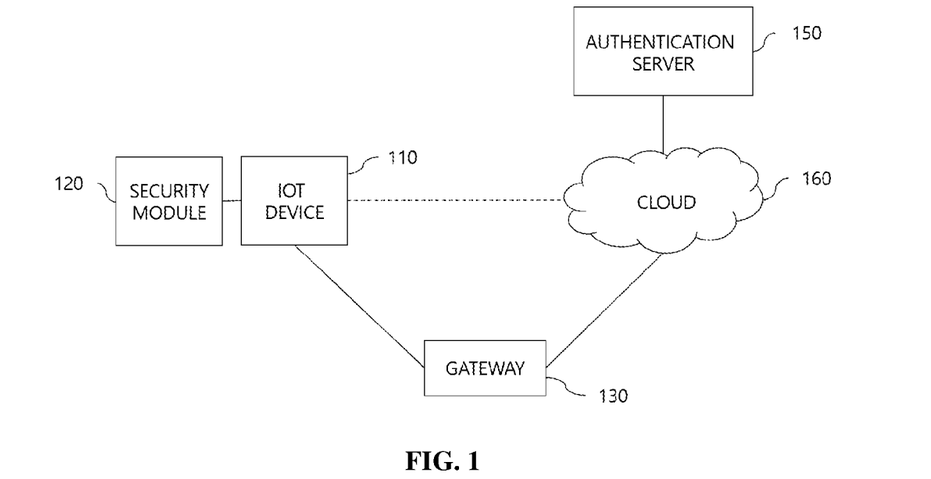
FIG. 1 is a diagram showing a structure of a system in which an Internet of Things (IoT) device connected to a cloud provides a security service using a hardware security module (HSM) according to an exemplary embodiment of the present disclosure.

FIG. 1 is a diagram showing a structure of a system in which an IoT device connected to a cloud provides a security service using an HSM according to an exemplary embodiment of the present disclosure.

As shown in the drawing, a system 100 in which an IoT device connected to a cloud provides a security service using an HSM may include at least one IoT device 110, an authentication server 150, a cloud 160, a gateway 130, and a security module 120.

The IoT device 110 may be connected to the cloud 160 through the gateway 130. FIG. 1 shows that the IoT device 110 is connected to the cloud 160 through the gateway 130, but the connection is not limited thereto. The IoT device 110 may directly access the cloud 160 without passing through the gateway 130. Although one IoT device 110 is shown in FIG. 1 for convenience of description, the number of IoT devices 110 is not limited thereto, and two or more IoT devices 110 may be connected to the cloud 160 or the gateway 130.

The cloud 160 may provide a function of connecting an IoT device, other servers, computing devices, and systems connected to the cloud 160 in a hardware manner, a function of processing a communication protocol between different devices, servers, pieces of equipment, and systems, a security and authentication function for IoT devices, services, and users, a function of gathering, visualizing, and analyzing data collected by IoT devices, and a function of integrating these functions with other services.

In an exemplary embodiment of the present disclosure, the cloud 160 may provide a function of storing and transmitting data for managing the IoT device 110. The data used for managing the IoT device 110 may include data used for IoT device onboarding, data used for IoT device management, and data used for security execution of an IoT device. For example, data stored in the cloud 160 may include an identifier (ID) of an IoT device, a session key for IoT device onboarding, IoT firewall rules used to control IoT device onboarding, and various pieces of data transmitted to and received from IoT devices. Also, the cloud 160 may store and transmit data of a service to be provided to the IoT device 110. For example, data stored in the cloud 160 may include data required for service registration, a service ID, a session key for service providing, and various pieces of data transmitted and received between IoT devices and an IoT service (server).

The gateway 130 provides a function of transmitting and receiving data between the IoT device 110 and the cloud 160. For example, the gateway 130 may include a wireless and/or wired communication interface which may transmit data transmitted and received between the IoT device 110 and the cloud 160 through a wireless or wired communication channel. The gateway 130 may perform a communication function according to a communication protocol which constitutes a part of a wireless network including a low-power wide-area network (LPWAN), such as Wi-Fi, Bluetooth, and long range (LoRa) conforming to the Institute of Electrical and Electronics Engineers (IEEE) 802.11 standard.

The security module 120 is a device including hardware or a combination of hardware and software which may perform security functions, such as security key generation, authentication of the IoT device 110, and encryption. For example, the security module 120 may be a hardware part, such as a circuit board, embedded in the IoT device 110 or a lightweight hardware device configured to be detachable from the IoT device 110.

For example, the security module 120 may generate a pair of public and private keys for authenticating the IoT device 110. The IoT device 110 may transmit a certificate generation request including the public key generated by the security module 120 and a device ID to the authentication server 150 through the cloud 160. The authentication server 150 may be a server device including at least one computing device which serves as a certification authority. The authentication server 150 may verify the public key and device ID included in the certificate generation request received from the IoT device 110 and then generate a certificate. The authentication server 150 may transmit the generated certificate to the IoT device 110 through the cloud 160. The IoT device 110 may store the certificate received from the authentication server 150 and the private key in the security module 120.

In the above-described example, the IoT device 110 may request the security module 120 to generate a pair of public and private keys for device authentication through a security service API. Also, the IoT device 110 may acquire the private key included in the certificate generation request from the security module 120 through the security service API. Further, the IoT device 110 may request the security module 120 to store the certificate received from the authentication server 150 through the security service API and the private key. Since the security service API is used, the IoT device 110 can perform various security functions and acquire and store security data without having to individually call security functions or security algorithms executed in the security module 120.

In an exemplary embodiment, when it is necessary to perform a security function, the IoT device 110 may download the security service API from the cloud 160 and install the security service API. In another exemplary embodiment, the security service API may be stored and installed in the IoT device 110 in manufacturing of the IoT device 110.

Figure 2:
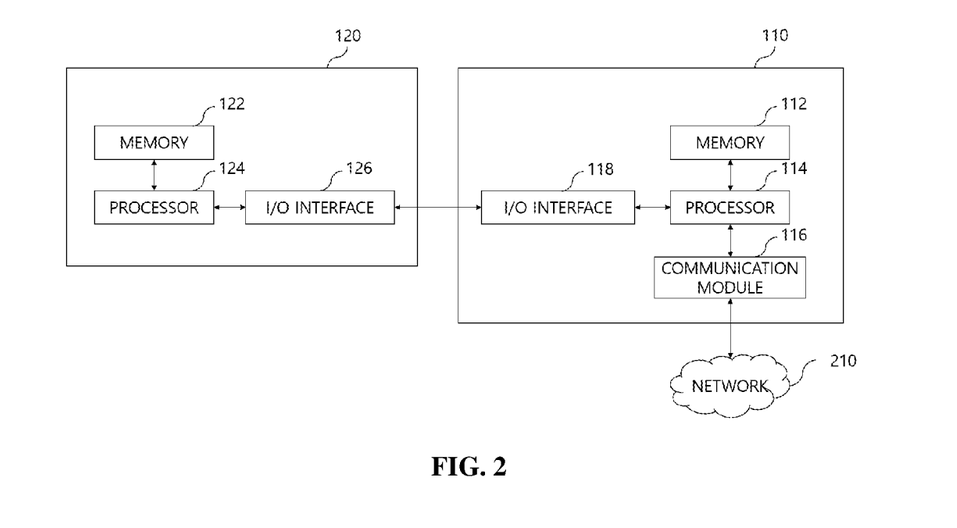
FIG. 2 is a diagram showing configurations of the HSM and the IoT device according to an exemplary embodiment of the present disclosure.

FIG. 2 is a diagram showing configurations of the HSM and the IoT device according to an exemplary embodiment of the present disclosure.

The IoT device 110 may include a memory 112, a processor 114, a communication module 116, and an input and output (I/O) interface 118. Likewise, the HSM 120 may include a memory 122, a processor 124, and an I/O interface 126. As shown in FIG. 2, the IoT device 110 and the HSM 120 may be configured to communicate information and/or data through I/O interfaces 118 and 126, respectively.

The memories 122 and 112 may include any non-transitory computer-readable recording medium. According to an exemplary embodiment of the present disclosure, the memories 122 and 112 may include a permanent mass storage device, such as a random access memory (RAM), a read-only memory (ROM), a disk drive, a solid state drive (SSD), or a flash memory. As another example, a permanent mass storage device, such as a ROM, an SSD, or a flash memory, may be included in the IoT device 110 or the HSM 120 as a permanent storage device distinguished from the memories 122 and 112. In the memories 122 and 112, an operating system and/or middleware and at least one program code (e.g., a code for executing the security service API installed and executed in the IoT device 110, a security API installed on the HSM 120 operated by calling the security service API, or a security algorithm) may be stored.

Such software components may be loaded from a computer-readable recording medium separate from the memories 122 and 112. Such a separate computer-readable recording medium may include a recording medium which can be directly connected to the IoT device 110 or the HSM 120. Examples of the computer-readable recording medium may include a floppy drive, a disk, a tape, a digital versatile disc (DVD)/compact disc (CD)-ROM drive, and a memory card. As another example, the software components may be loaded into the memory 112 and 122 through the I/O interfaces 118 and 126 or the communication module 116 rather than a computer-readable recording medium. For example, at least one program may be loaded into the memories 122 and 112 on the basis of a computer program (e.g., the above-described security service API) installed by files provided through a network 210 by developers or a file distribution system which distributes installation files of applications.

The processors 124 and 114 may be configured to process instructions of a computer program by performing basic arithmetic, logic, and I/O operations. Instructions may be provided to the processors 124 and 114 by the memories 122 and 112 or the communication module 116. For example, the processors 124 and 114 may be configured to execute received instructions according to program codes stored in storage devices such as the memories 122 and 112.

The communication module 116 may provide a configuration or function for the IoT device 110 and the cloud 160 or the gateway 130 to communicate with each other through the network 210 and may provide a configuration or function for the IoT device 110 to communicate with another computing device or another system (e.g., another cloud system or an IoT service server). For example, a request (e.g., a request for security key generation through the security service API) generated by the processor 114 of the IoT device 110 according to a program code stored in a storage device, such as the memory 112, may be transferred to the HSM 120 through the I/O interfaces 118 and 126. Conversely, a control signal, instruction, or the like provided according to the control of the processor 124 of the HSM 120 may be received by the IoT device 110 through the I/O interfaces 126 and 118. For example, the IoT device 110 may receive information related to a public key for device authentication from the HSM 120 through the I/O interface 118.

The I/O interfaces 126 and 118 may be I/O interfaces for inputting and outputting data or information or supplying power. For example, the I/O interface 126 and 118 may be any one of a network interfaces (e.g., an Ethernet interface), a card interface (e.g., Compact Flash), a serial I/O interface, and an interface providing a universal serial bus (USB) connection but is not limited thereto. FIG. 2 shows the I/O interfaces 126 and 118 as elements separately configured from the processors 124 and 114. However, the I/O interfaces 126 and 118 are not limited thereto and may be configured to include the processors 124 and 114.

The IoT device 110 or the HSM 120 may include a larger number of components than shown in FIG. 2. However, it is unnecessary to clearly show most components of related arts. According to an exemplary embodiment of the present disclosure, the IoT device 110 may be implemented to include at least some of the above-described components. Also, the IoT device 110 may further include other components, such as a transceiver, a global positioning system (GPS) module, a camera, various sensors, and a database.

According to an exemplary embodiment of the present disclosure, the processor 114 of the IoT device 110 may be configured to call or execute the security service API for executing security services, such as key generation for device authentication, encryption, certificate generation and storage. In this case, a program code related to the security service API may be loaded into the memory 112 of the IoT device 110. While the security service API is called or executed, the processor 114 of the IoT device 110 may receive information and/or data from the HSM 120 through the I/O interface 118 and process and store the received information and/or data in the memory 112. Also, such information and/or data may be provided to another computing device connected to the network or the cloud 160 through the communication module 116.

The processor 114 may be configured to output processed information and/or data through output devices, such as a display output device (e.g., a touchscreen or a display) and a sound output device (e.g., a speaker), of the IoT device 110. According to an exemplary embodiment of the present disclosure, information and/or data provided by the security service API may be displayed through the display output device and the like. According to another exemplary embodiment of the present disclosure, information and/or data provided by the security service API may be output through the sound output device and the like.

A method by which the processor 114 of the IoT device 110 provides a security service by calling or executing the security service API will be described in detail below.

Figure 3:
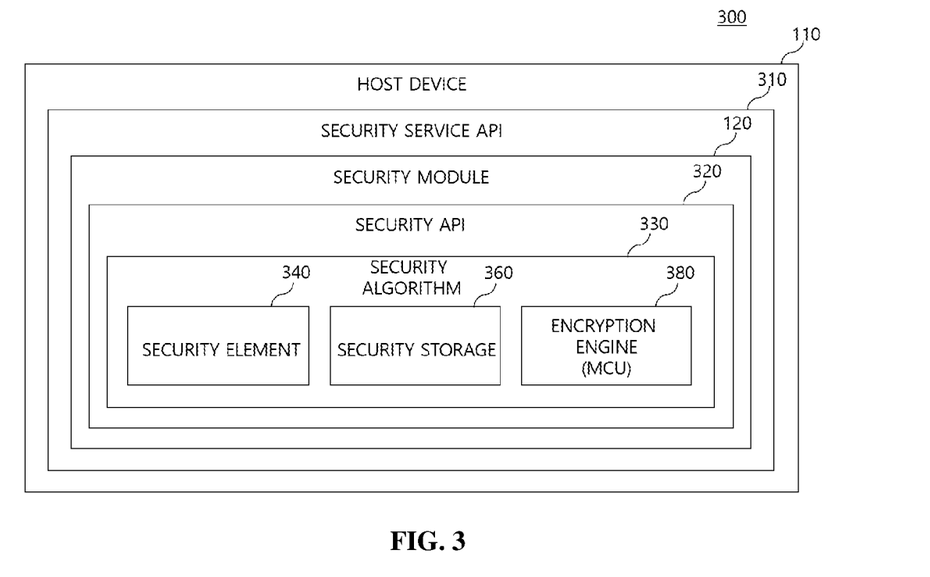
FIG. 3 is a diagram showing a structure of a system including a security service application programming interface (API) for managing and controlling an HSM according to an exemplary embodiment of the present disclosure.

FIG. 3 is a diagram showing a structure of a system including a security service API for managing and controlling an HSM according to an exemplary embodiment of the present disclosure.

A system 300 shown in FIG. 3 may include a host device 110 and a security module 120 connected to the host device 110. In an example, the host device 110 may be an IoT device which is connected to the IoT to collect and analyze data and may be, for example, one of one or more sensors or actuators installed in a smart factory. Also, the security module 120 is a hardware-based security device which may be embedded in the host device 110 or connected to the host device 110. The security module 120 may be implemented as a lightweight hardware device in a substrate form or another form or as a device in which software and hardware are combined.

The security module 120 may include a security element 340 which executes a function of generating a key for device authentication and a function of accelerating an encryption engine, a security storage 360 which stores security data, such as a private key, a device certificate, and security firmware, and an encryption engine 380 which executes a security function such as encryption. The encryption engine 380 may be implemented as a hardware computing device, such as a microcontroller unit (MCU), but is not limited thereto. The encryption engine 380 may also be implemented as a combination of software and hardware such as a semiconductor chip.

As shown in FIG. 3, the system 300 including a security service API may include a security service API 310 which may be called by the host device 110. The security service API 310 may be a software component which is built in the host device 110 or downloaded from an external computing device or server, such as the cloud 160, and installed on the host device 110.

The security service API 310 may receive parameters (e.g., data to be encrypted) for defining a security service requested by the host device 110, and the parameters may be converted into other parameters (e.g., an encryption method and the size of data to be encrypted) which are processable by the security module 120.

The security module 120 may call a security API 320 using the converted parameters. The security API 320 may convert input parameters into other parameters (e.g., instructions or data executable by a hardware component such as the security element 340) which are processable by a security algorithm 330. The security algorithm 330 may be executed to control the security element 340, the security storage 360, and the encryption engine 380 on the basis of the parameters converted by the security API 320.

As described above, the host device 110 may transmit a security service request to the security module 120 through the security service API 310 built or installed therein. The security module 120 may convert the security service request received through the security service API 310 into a security execution request and convert the converted security execution request into the security algorithm 330 through the security API 320. As the security module 120 executes the security algorithm 330, one or more of the security element 340, the security storage 360, and the encryption engine 380 are controlled so that security functions, such as key generation and storage for device authentication and encryption, may be performed.

Figure 4:
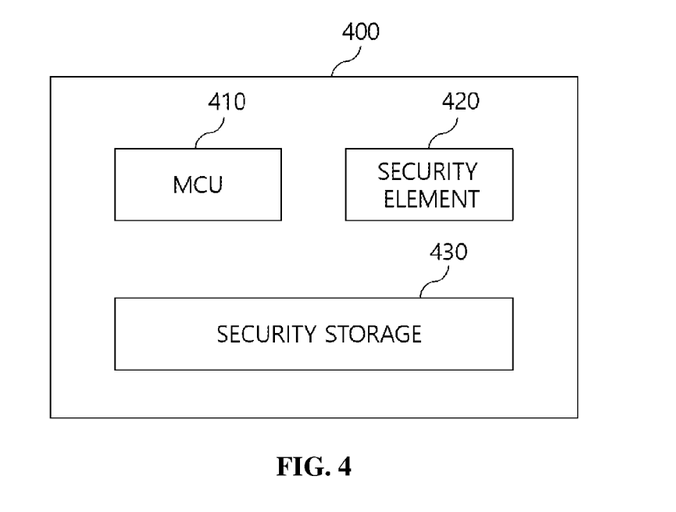
FIG. 4 is a block diagram showing a configuration of an HSM according to an exemplary embodiment of the present disclosure.

FIG. 4 is a block diagram showing a configuration of an HSM according to an exemplary embodiment of the present disclosure. As shown in the drawing, a security module 400 may include an MCU 410, a security element 420, and a security storage 430.

The MCU 410 may refer to, for example, a hardware device which is manufactured with a microprocessor and an I/O module as one semiconductor chip and which performs a certain function. In an example, the MCU 410 may include a processor core, a memory, and a programmable I/O port. In another example, the MCU 410 may store a machine language code which has been programmed to perform a predetermined security function in a memory such as a NOR flash memory, an erasable programmable ROM (EPROM), or a one-time programmable (OTP) ROM. Also, the MCU 410 may include a static RAM (SRAM) having a limited capacity to store variables or data for executing the machine language code.

In an exemplary embodiment of the present disclosure, the MCU 410 may store, install, and/or execute a security service API. Also, the MCU 410 may execute a security manager which performs a function of managing and controlling the security element 420 and the security storage 430. The MCU 410 may store, install, and/or execute an encryption engine which performs encryption. The encryption engine may be software or hardware which executes an encryption algorithm or a combination thereof.

The security element 420 may be a hardware device for executing security functions including a function of generating a key for device authentication and a function of accelerating the encryption engine. For example, the security element 420 may include a security chip or a security device manufactured according to the trusted platform module (TPM) standard or a security element which executes security functions such as an HSM. FIG. 4 shows that the security element 420 is outside the MCU 410. However, the security element 420 is not limited to the configuration and may be included in the MCU 410 according to an example of implementation.

The security storage 430 may store various pieces of security data including a device authentication key, encrypted data, a device certificate, security firmware, etc. generated by the MCU 410 and/or the security element 420. In an exemplary embodiment of the present disclosure, the security storage 430 may be implemented as a semiconductor memory device, such as a flash memory or a RAM, but is not limited thereto. The security storage 430 may be configured so that the MCU 410 or the security element 420 may access only a specific storage area (e.g., a specific block, segment, or page). Also, the security storage 430 may be configured to use a protection key in order to prevent the MCU 410, the security element 420, or an external device from accessing a non-allowed storage area. When the security storage 430 uses a protection key structure, the protection key may be connected to each storage area. In this case, when a protection key of a processor or an external device trying to access a specific storage area of the security storage 430 coincides with a value connected to the storage area to be accessed, the processor or the external device can access the storage area.

Figure 5:
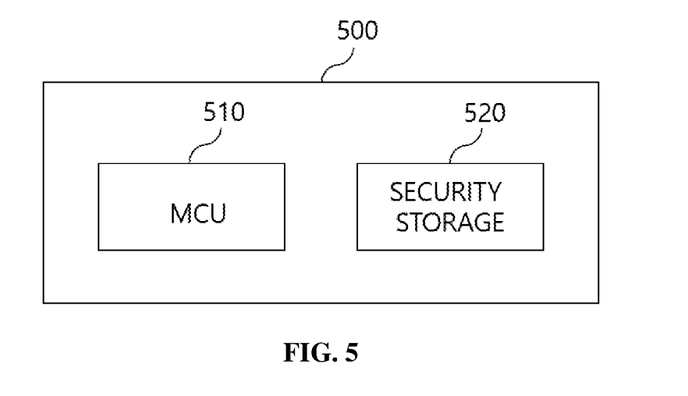
FIG. 5 is a block diagram showing a configuration of an HSM according to another exemplary embodiment of the present disclosure.

FIG. 5 is a block diagram showing a configuration of an HSM according to another exemplary embodiment of the present disclosure.

As shown in the drawing, a security module 500 may include an MCU 510 and a security element 520. The MCU 510 and the security element 520 may include functions or configurations identical or similar to those of the MCU 410 and the security element 420 of FIG. 4 described above. Consequently, functions and configurations of the MCU 510 and the security element 520 will not be described in detail again.

The MCU 510 and/or the security element 520 may further include a memory unit which stores various pieces of security data including a device authentication key, encrypted data, a device certificate, security firmware, etc. generated by the MCU 510 and/or the security element 520. In an exemplary embodiment of the present disclosure, the MCU 510 and/or the security element 520 may be implemented to further include a semiconductor memory unit, such as a flash memory and a RAM, but is not limited thereto. In this case, the MCU 510 and/or the security element 520 may be configured to prevent an external device from accessing a non-allowed storage area of the memory unit.

Figure 6:
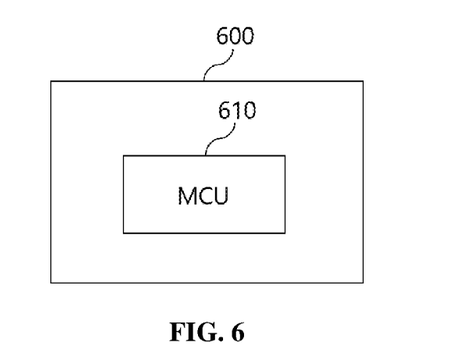
FIG. 6 is a block diagram showing a configuration of an HSM according to still another exemplary embodiment of the present disclosure.

FIG. 6 is a block diagram showing a configuration of an HSM according to still another exemplary embodiment of the present disclosure.

As shown in the drawing, a security module 600 may include an MCU 610. The MCU 610 may include a function or a configuration identical or similar to that of the MCU 410 of FIG. 4 or the MCU 510 of FIG. 5.

The MCU 610 may further include a hardware element for performing security functions including a function of generating a key for device authentication, a function of accelerating an encryption engine, and the like. For example, the MCU 610 may further include a security chip or a security device manufactured according to the TPM standard or a security element which executes security functions such as an HSM.

Also, the MCU 610 may further include a memory unit which may store various pieces of security data including a device authentication key, encrypted data, a device certificate, security firmware, etc. generated by the MCU 610. In an exemplary embodiment of the present disclosure, the MCU 610 may be implemented to further include a semiconductor memory unit, such as a flash memory and a RAM, but is not limited thereto. In this case, the MCU 610 may be configured to prevent an external device from accessing a non-allowed storage area of the memory unit.

Figure 7:
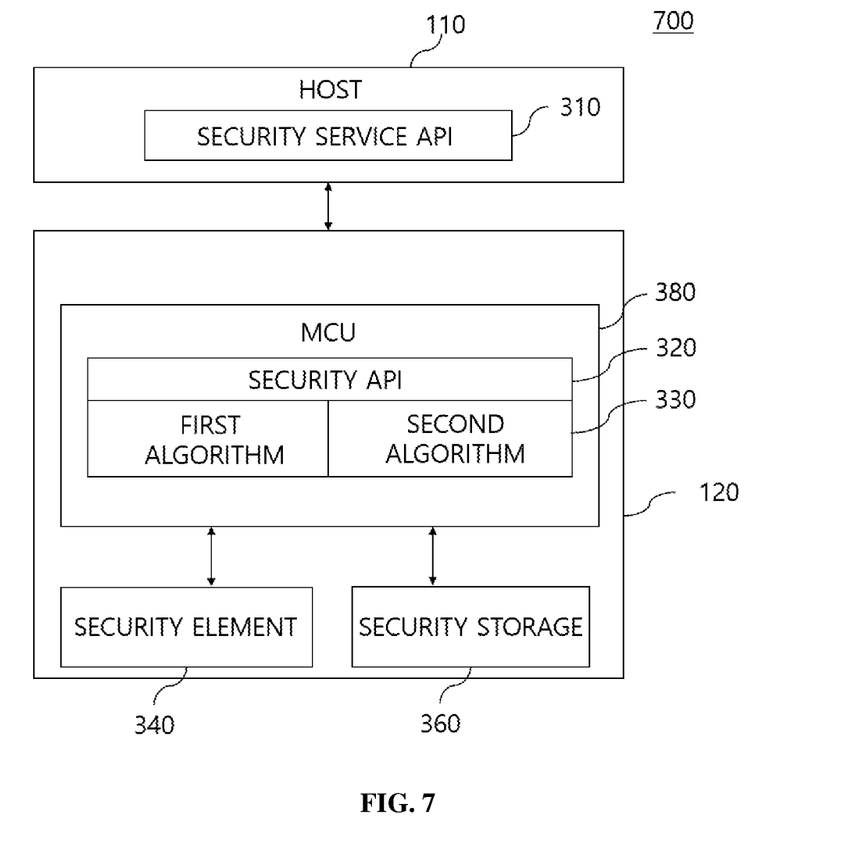
FIG. 7 is a diagram showing a structure of a system for providing an IoT security service using an HSM according to an exemplary embodiment of the present disclosure.

FIG. 7 is a diagram showing a structure of a system for providing an IoT security service using an HSM according to an exemplary embodiment of the present disclosure.

As shown in the drawing, a system 700 may include a host device 110 and a security module 120 which is connected to the host device 110 and communicates with the host device 110. In an example, the host device 110 is an IoT device which is connected to the IoT to collect and analyze data and may be, for example, one of one or more sensors or actuators installed in a smart factory. Also, the security module 120 is a hardware-based security device which may be embedded in the host device 110 or connected to the host device 110. The security module 120 may be implemented as a lightweight hardware device in a substrate form or another form or as a device in which software and hardware are combined.

According to an exemplary embodiment of the present disclosure, to request an IoT security service, the host device 110 may transmit a security service request to the security module 120 by calling the security service API 310. The security module 120 may include any one of the configurations shown in FIGS. 4 to 6.

In this case, the security module 120 may convert the security service request represented as the security service API 310 into a security execution request. In this process, the security module 120 may convert parameters (e.g., data to be encrypted) included in the security service request into parameters (e.g., an encryption method and the size of data to be encrypted) of the security execution request. The MCU 380 of the security module 120 may execute the received security execution request by calling the security API 320.

As such, as the security API 320 is executed, the security execution request may be converted into a request to execute the security algorithm 330 (e.g., a first algorithm and a second algorithm). In this process, the MCU 380 may convert parameters of the security execution request into other parameters (e.g., instructions or data executable by a hardware component such as the security element 340) processable by the security algorithm 330. The MCU 380 may be configured to execute the security algorithm 330 by controlling the security element 340 or the security storage 360 according to the converted execution request of the security algorithm 330.

According to the configurations of the exemplary embodiments described above, it is possible to efficiently implement an IoT security technology host device by using a hardware system configuration in which an IoT host device can easily control a hardware-based security module and a programming interface which is intuitive and easy to understand. Specifically, the host device can make a security service request using a high-level security service API without parameter information or a method of executing detailed hardware components of the security module or an algorithm or instructions for executing the hardware components. Meanwhile, the security module can further strengthen the safety and security of a security service request provided by the security module by executing the security service request received through the security service API without exposing security data processed or stored by the internal hardware components.

Figure 8:
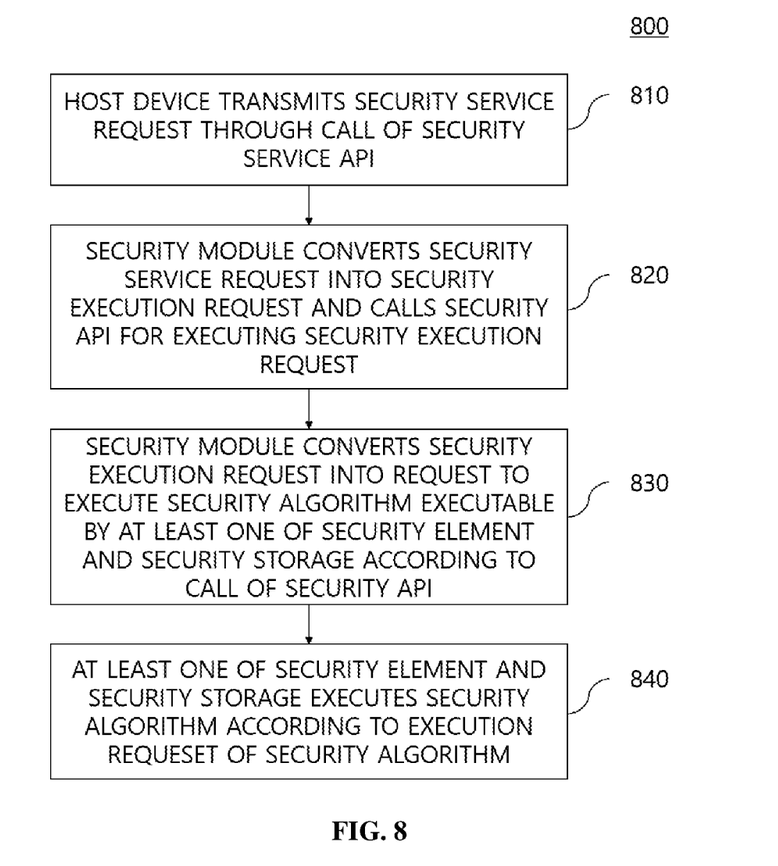
FIG. 8 is a flowchart illustrating a method of providing an IoT security service using an HSM according to an exemplary embodiment of the present disclosure.

FIG. 8 is a flowchart illustrating a method of providing an IoT security service using an HSM according to an exemplary embodiment of the present disclosure.

As shown in the drawing, a method 800 of providing an IoT security service using an HSM may start with an operation 810 in which a host device transmits a security service request by calling a security service API. Referring to FIGS. 1 to 7, to request an IoT security service, the host device 110 may transmit a security service request to the security module 120 by calling the security service API 310 according to an exemplary embodiment of the present disclosure. The security module 120 may include any one of the configurations shown in FIGS. 4 to 6.

The security module may convert the security service request into a security execution request and call a security API to execute the security execution request (820). Referring to FIGS. 1 to 7, in an exemplary embodiment of the present disclosure, the security module 120 may convert the security service request represented as the security service API 310 into a security execution request. In this process, the security module 120 may convert parameters (e.g., data to be encrypted) included in the security service request into parameters (e.g., an encryption method and the size of data to be encrypted) of the security execution request. The MCU 380 of the security module 120 may execute the received security execution request by calling the security API 320.

As the security API is called, the security API may convert the security execution request into an execution request of a security algorithm which is executable by at least one of a security element and a security storage (830). Referring to FIGS. 1 to 7, in an exemplary embodiment of the present disclosure, as the security API 320 is executed, the security execution request may be converted into an execution request of the security algorithm 330 (e.g., a first algorithm and a second algorithm). In this process, the MCU 380 may convert the parameters of the security execution request into other parameters (e.g., instructions or data executable by a hardware component such as a security element) processable by the security algorithm 330.

At least one of the security element and the security storage may execute a security algorithm according to the security algorithm execution request (840). Referring to FIGS. 1 to 7, in an exemplary embodiment of the present disclosure, the MCU 380 may be configured to execute the security algorithm 330 by controlling the security element 340 or the security storage 360 according to the converted security algorithm execution request.

According to various exemplary embodiments of the present disclosure, it is possible to provide a hardware system configuration in which an IoT host device can easily control a hardware-based security module and a programming interface which is intuitive and easy to understand. When the hardware system configuration and programming interface according to exemplary embodiments of the present disclosure are used, a security service provided by an IoT device can be efficiently performed.

Effects of the present disclosure are not limited to those mentioned above, and other effects not mentioned will be clearly understood by those of ordinary skill in the art from the following claims.

The apparatus or system according to the various embodiments described above may represent various types of devices, such as a desktop computer, a laptop computer, a wireless telephone, a cellular telephone, a wireless multimedia device, a personal digital assistant (PDA), a modem installed outside or inside a computer, a device communicating over a wireless channel, and the like. Such a device may have various names, such as an access terminal (AT), an access unit, a subscriber unit, a mobile station, a mobile device, a mobile unit, a mobile telephone, a mobile, a remote station, a remote terminal, a remote unit, a user device, user equipment, a handheld device, and the like. Any device described herein may include a memory for storing instructions and data required to execute the above described method of preventing distribution of illegal contents over the Internet, as well as hardware, software, firmware, or combinations thereof.

The techniques described in the present disclosure may be implemented in various devices. For example, the techniques may be implemented in hardware, firmware, software, or a combination thereof. Those skilled in the art should appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the specific application and design constraints imposed on the overall system. Skilled artisans may implement the described functionality in varying ways for each specific application, but such implementation decisions should not be interpreted as causing a departure from the scope of the present disclosure.

In the hardware implementation, processing units used to perform the techniques may be implemented in one or more application specific ICs (ASICs), digital signal processes (DSPs), digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, a computer, or in a combination thereof.

Accordingly, the various illustrative logical blocks, modules, and circuits described in connection with the present disclosure may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but, alternatively, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configurations.

In the firmware and/or software implementation, the techniques may be implemented in instructions stored in a computer-readable medium, such as a RAM, a ROM, a non-volatile RAM (NVRAM), a programmable read-only memory (PROM), an erasable programmable read-only memory (EPROM), an electrically erasable PROM (EEPROM), a flash memory, a CD, a magnetic or optical data storage device, and the like. The instructions may be implementable by one or more processors, and may allow the processor (the processors) to perform specific aspects of the function described in the present disclosure.

If implemented in software, the functions may be formed as one or more instructions or code and stored on a computer-readable medium or transmitted through the computer-readable medium. Computer-readable media include both computer storage media and communication media including any medium that facilitates transfer of a computer program from one place to another. A storage media may be any available media that may be accessed by a computer. By way of non-limiting example, such a computer-readable media may include a RAM, a ROM, an EEPROM, a CD-ROM or another optical disc storage, a magnetic disk storage or another magnetic storage device, or any other medium that may be used to carry or store desired program code in the form of instructions or data structures and that may be accessed by a computer. Also, any connection is appropriately referred to as a computer-readable medium.

If the software is transmitted from a website, server, or another remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared rays, a radio, and microwaves are included in the definition of medium. Disk and disc, as used herein, include a CD, a laser disc, an optical disc, a DVD, a floppy disk, and a blue-ray disc where disks usually reproduce data magnetically, while discs reproduce data optically with lasers. Combinations of the above should also be included within the scope of computer-readable media.

Software modules may reside in a RAM, a flash memory, a ROM, an EPROM, an EEPROM, registers, a hard disk, a removable disk, a CD-ROM, or any other form of storage medium known in the art. An illustrative storage medium may be coupled to a processor such that the processor reads information from, or writes information to, the storage medium. Alternatively, the storage medium may be integrated into the processor. The processor and the storage medium may reside in an ASIC. The ASIC may reside in a user terminal. Alternatively, the processor and the storage medium may reside as separate components in a user terminal.

The preceding description of the disclosed embodiments is provided to enable any person skilled in the art to make or use the present disclosure. Various modifications to these embodiments will be readily apparent to those skilled in the art, and the generic principles defined herein may be applied to other embodiments without departing from the scope of the invention. Thus, the present disclosure is not intended to be limiting to the embodiments shown herein but is to be accorded the widest scope consistent with the principles and novel features disclosed herein.

Even if the illustrative embodiments may describe the use of aspects of the current disclosed subject matter in contexts of one or more independent computer systems, the subject matter of the present disclosure is not limited thereto. Rather, the subject matter may be implemented in connection with any computing environment, such as a network or distributed computing environment. Further, the aspects of the currently disclosed subject matter may be implemented in or across a plurality of processing chips and devices, and similarly, a storage may be subjected across the plurality of devices. Such devices may include personal computers (PCs), network servers, and handheld devices.

Although the subject matter has been described in language specific to structural features and/or methodological acts, it should be understood that the subject matter defined in the appended claims is not necessarily limited to the specific features or acts described above. Rather, the specific features and acts described above are disclosed as example forms of implementing the claims.

The method described herein has been described with reference to specific embodiments but may be embodied as computer-readable codes on a computer-readable recording medium. The computer-readable recording medium is any data storage device that can store data that can be thereafter read by a computer system.

Examples of the computer-readable recording medium include a ROM, a RAM, a CD-ROM, a magnetic tape, a floppy disk, an optical data storage, and the like. In addition, the computer-readable recording medium may be distributed over network-connected computer systems so that computer readable codes may be stored and executed in a distributed manner. In addition, functional programs, codes, and code segments for implementing the embodiments may be easily construed by programmers skilled in the art to which the present disclosure pertains.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for providing an Internet of Things (IoT) security service using a hardware security module, the system comprising:

a host IoT device configured to transmit a security service request by calling a security service application programming interface (API); and the hardware security module configured to convert the security service request into a security execution request and execute the security execution request by calling a security API, which is different from the security service API, wherein the hardware security module converts the security execution request into a request to execute a security algorithm executable by at least one of a security element and a security storage according to the call of the security API, wherein when the security service API is called by the host IoT device, the security service API receives a first parameter for defining the security service request and converts the first parameter into a second parameter processable by the hardware security module, when the security API is called by the hardware security module, the second parameter is converted into a third parameter processable by the security algorithm, and the security algorithm is executed to control at least one of the security element and the security storage on the basis of the third parameter.

2. The system of claim 1, wherein the hardware security module is configured to execute the security algorithm by controlling at least one of the security element and the security storage according to the execution request of the security algorithm.

3. The system of claim 1, wherein the security storage stores at least a part of security data including a private key for device authentication, a device certificate, and security firmware.

4. The system of claim 1, wherein the security element performs a security function including a function of generating a key for device authentication and a function of accelerating an encryption engine.

5. A method of providing an Internet of Things (IoT) security service using a hardware security module, the method comprising:

transmitting, by a host IoT device, a security service request by calling a security service application programming interface (API);

converting, by the hardware security module, the security service request into a security execution request and calling a security API, which is different from the security service API, for executing the security execution request; and converting, by the hardware security module, the security execution request into a request to execute a security algorithm executable by at least one of a security element and a security storage according to the call of the security API, wherein the transmitting the security service request comprises:

when the security service API is called by the host IoT device, receiving, by the security service API, a first parameter for defining the security service request and converting the first parameter into a second parameter processable by the hardware security module, wherein the converting the security service request comprises:

when the security API is called by the hardware security module, converting the second parameter into a third parameter processable by the security algorithm, and wherein the converting the security execution request comprises:

executing the security algorithm to control at least one of the security element and the security storage on the basis of the third parameter.

6. The method of claim 5, further comprising executing, by the at least one of the security element and the security storage, the security algorithm according to the execution request of the security algorithm.

7. A non-transitory computer-readable storage medium storing at least one program configured to be executed by at least one processor of a computing device, wherein the at least one program comprises instructions for performing a method comprising:

transmitting, by a host IoT device, a security service request by calling a security service application programming interface (API);

converting, by a hardware security module, the security service request into a security execution request and calling a security API, which is different from the security service API, for executing the security execution request; and converting, by the hardware security module, the security execution request into a request to execute a security algorithm executable by at least one of a security element and a security storage according to the call of the security API, wherein the transmitting the security service request comprises:

when the security service API is called by the host IoT device, receiving, by the security service API, a first parameter for defining the security service request and converting the first parameter into a second parameter processable by the hardware security module, wherein the converting the security service request comprises:

when the security API is called by the hardware security module, converting the second parameter into a third parameter processable by the security algorithm, and wherein the converting the security execution request comprises:

executing the security algorithm to control at least one of the security element and the security storage on the basis of the third parameter.

8. The non-transitory computer-readable storage medium of claim 7, wherein the method further comprises executing, by the at least one of the security element and the security storage, the security algorithm according to the execution request of the security algorithm.

* * * * *